United States Patent
Park et al.

(10) Patent No.: US 8,121,094 B2
(45) Date of Patent: Feb. 21, 2012

(54) METHOD FOR MANAGING CROSS-LAYER HANDOVER

(75) Inventors: Soongi Park, Daejon (KR); Taehyong Kim, Gumi-si (KR); Yeon-Seung Shin, Daejon (KR); Yeongjin Kim, Daejon (KR)

(73) Assignees: Electronics and Telecommunications Research Institute, Daejeon (KR); Samsung Electronics Co., Ltd., Suwon-si, Gyeonggi-do (KR)

( * ) Notice: Subject to any disclaimer, the term of this patent is extended or adjusted under 35 U.S.C. 154(b) by 1088 days.

(21) Appl. No.: 11/949,837

(22) Filed: Dec. 4, 2007

(65) Prior Publication Data

US 2008/0130585 A1 Jun. 5, 2008

(30) Foreign Application Priority Data

Dec. 4, 2006 (KR) .......................... 10-2006-0121200
Nov. 12, 2007 (KR) .......................... 10-2007-0114853

(51) Int. Cl.
  *H04W 4/00* (2009.01)
(52) U.S. Cl. ...................................... 370/332
(58) Field of Classification Search .................. 370/332
  See application file for complete search history.

(56) References Cited

U.S. PATENT DOCUMENTS

| | | | |
|---|---|---|---|
| 5,613,205 A | 3/1997 | Dufour | |
| 5,711,003 A * | 1/1998 | Dupuy | 455/436 |
| 6,006,077 A * | 12/1999 | Shull | 455/226.2 |
| 7,027,415 B1 * | 4/2006 | Dahlby et al. | 370/322 |
| 2006/0146753 A1* | 7/2006 | Park et al. | 370/331 |
| 2009/0129335 A1* | 5/2009 | Lee et al. | 370/331 |

FOREIGN PATENT DOCUMENTS

| | | |
|---|---|---|
| KR | 1999-0056030 | 7/1999 |
| KR | 1020000060076 A | 10/2000 |
| KR | 10-2006-0062950 | 6/2006 |
| KR | 1020060067403 A | 6/2006 |
| KR | 100633505 | 10/2006 |

OTHER PUBLICATIONS

The Notice of Allowance for Korean Application No. 10-2007-0114853, Jan. 13, 2010, 1 page, KIPO, Korea.

Office Action dated Aug. 21, 2009, for Korean application No. 10-2007-0114853.

* cited by examiner

*Primary Examiner* — Jeffery Pwu
*Assistant Examiner* — Farhad Ali
(74) *Attorney, Agent, or Firm* — Lowe Hauptman Ham & Berner, LLP (57) ABSTRACT

Provided is a method for managing a cross-layer handover. The method includes the steps of: managing a predetermined number of neighbor cells as a handover candidate set based on signal strength and route estimation; transmitting a Measurement Report message having the handover candidate set information to a source base station according to a reporting event; and performing a handover according to a Handover Command message received from the source base station.

18 Claims, 7 Drawing Sheets

| - | $Cell_{prev}$ | - | - | $Cell_{prev}$ | preq. |

KDB element for road-based mobility pattern

FIG. 6B

| $UE_{id}$ | $Cell_{prev}$ | $WDay_{in}$ | $Time_{in}$ | $Cell[i]_{next}$ | preq. |

KDB element for user/time-based mobility pattern

FIG. 10

METHOD FOR MANAGING CROSS-LAYER HANDOVER

CROSS-REFERENCE(S) TO RELATED APPLICATIONS

The present invention claims priority of Korean Patent Application Nos. 10-2006-0121200 and 10-2007-0114853 filed on Dec. 4, 2006 and Nov. 12, 2007, respectively, which are incorporated herein by reference.

BACKGROUND OF THE INVENTION

1. Field of the Invention

The present invention relates to a method for managing a cross-layer handover; and, more particularly, to a method for managing a cross-layer handover, which can optimize the handover performance of a mobile communication system by providing rapid and reliable handover decision, minimization of a data interruption time caused by a handover, a handover without a data loss, and a handover with minimized data retransmission and rearrangement by using a cross-layer scheme in the mobile communication system employing a hard handover.

Embodiments of the present invention take a 3G Long-Term Evolution (LTE) system as an example of a mobile communication system, and provide methods for supporting a rapid and lossless handover using a cross-layer mobility management scheme. It should be noted that the present invention is not limited to the above embodiments.

This work was supported by the IT R&D program for MIC/IITA [2005-S-404-22, "Research and development on 3G long-term evolution access system"]

2. Description of Related Art

3rd Generation Partnership Project (3GPP) standardizes a 3G Long-Term Evolution (LTE) system as an intermediate system that evolves from the 3G mobile communication system to the 4 G communication system. The 3G LTE system requires an efficient mobility supporting scheme.

The 3GPP has proposed the standard specifications for the LTE system by the middle of 2007 and aims at commercializing the LET system between 2009 and 2010. '3GPP TSG RAN' meetings are being conducted to define the standard specifications for the system. The protocol structure and the main functions of the system have been defined, but many parts have not yet been defined and are under discussion based on the 3G system technologies.

A cross-layer scheme is a protocol design scheme deviating from a standard layer based communication structure introduced for the performance enhancement in wireless network environments, which actively uses the connection between protocol layers.

The cross-layer scheme is being used for a variety of purposes such as communication performance optimization and power consumption reduction in wireless networks. However, the cross-layer scheme is not yet fully applied to handover schemes for mobile communication systems, particularly to handover schemes for the 3G and 3G LTE systems.

SUMMARY OF THE INVENTION

An embodiment of the present invention is directed to providing a method for managing a cross-layer handover, which can support a rapid, lossless and optimal handover in a mobile communication system.

Another embodiment of the present invention is directed to providing a method for managing a cross-layer handover, which can optimize the handover performance of a mobile communication system by providing rapid and reliable handover decision, minimization of a data interruption time caused by a handover, a handover without a data loss, and a handover with minimized data retransmission and rearrangement by using a cross-layer scheme and a mobility prediction scheme in the mobile communication system employing a hard handover.

In accordance with an aspect of the present invention, there is provided a method for managing a cross-layer handover in a user equipment, the method including the steps of: managing a predetermined number of neighbor cells as a handover candidate set based on signal strength and route estimation; transmitting a Measurement Report message having the handover candidate set information to a source base station according to a reporting event; and performing a handover according to a Handover Command message received from the source base station.

In accordance with another aspect of the present invention, there is provided a method for managing a cross-layer handover in a base station, the method including the steps of: predicting, by a source base station, a handover cell using information about a handover candidate set received from a user equipment; deciding, by the source base station, a handover according to a Handover Confirm message received from a target base station in the predicted handover cell; transmitting a handover command from the source base station to the user equipment; and calculating, by the target base station, a time alignment value for a gateway, transmitting the calculated time alignment value to the gateway, transmitting a downlink packet to the user equipment, and completing the handover.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter. Thus, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

The embodiments of the present invention take a 3G Long Term Evolution (LTE) system as an example of a mobile communication system, and the following description will focus on an evolved Node B (eNB) of the 3G LET system. The evolved Node B (eNB) is an example of a base station.

Figure 1:
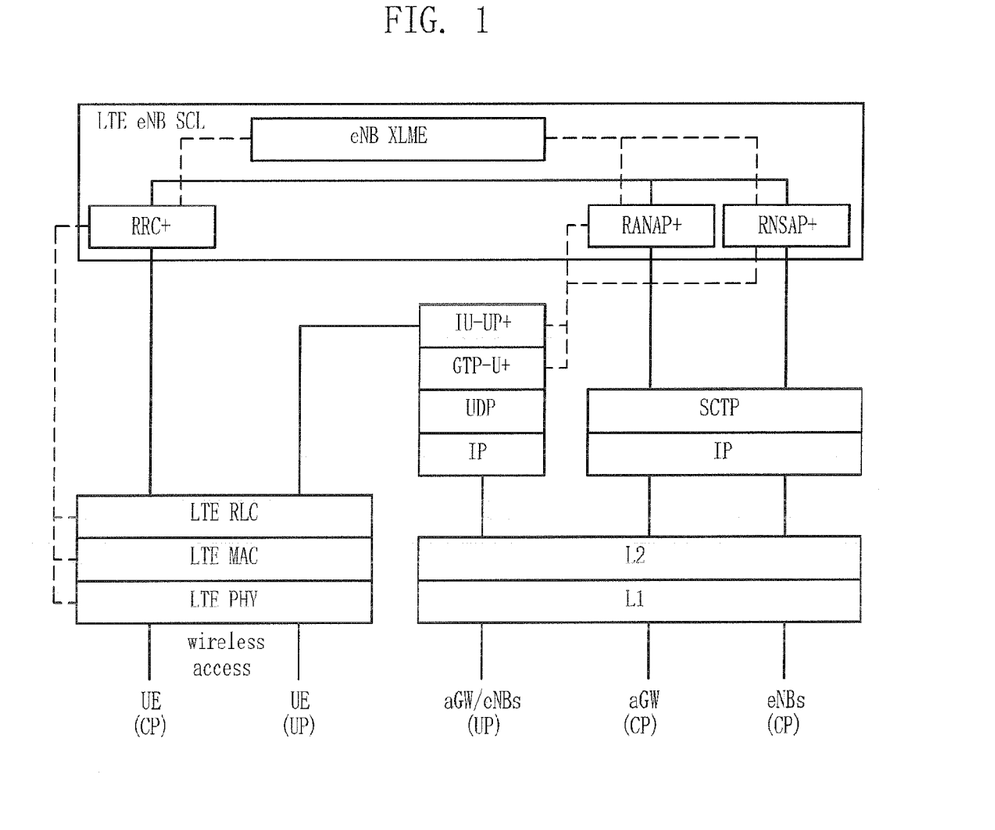
FIG. 1 is a diagram illustrating an example of the connection relationship and the cross-layer protocol stack structure of an evolved Node B (eNB), to which the present invention is applied.

FIG. 1 is a diagram illustrating an example of the connection relationship and the cross-layer protocol stack structure of an eNB, to which the present invention is applied.

Referring to FIG. 1, a cross-layer structure includes a Cross-Layer Mobility Engine (XLME) of an evolved Node B (eNB) Signaling and Controlling Layer (SCL) and an interface with a lower layer protocol.

The XLME executes a cross-layer mobility management algorithm including handover prediction and decision algorithms and handover coordination and optimization algorithms.

An LTE eNB Signaling and Controlling Layer (SCL) monitors lower-layer protocol information and controls related operations using a cross-layer interface function provided by Radio Resource Control (RRC), Radio Access Network Application Protocol (RANAP) and Radio Network Subsystem Application Part (RNSAP).

Thus, the present invention can be realized using the conventional interface without defining a separate new interface.

Figure 2:
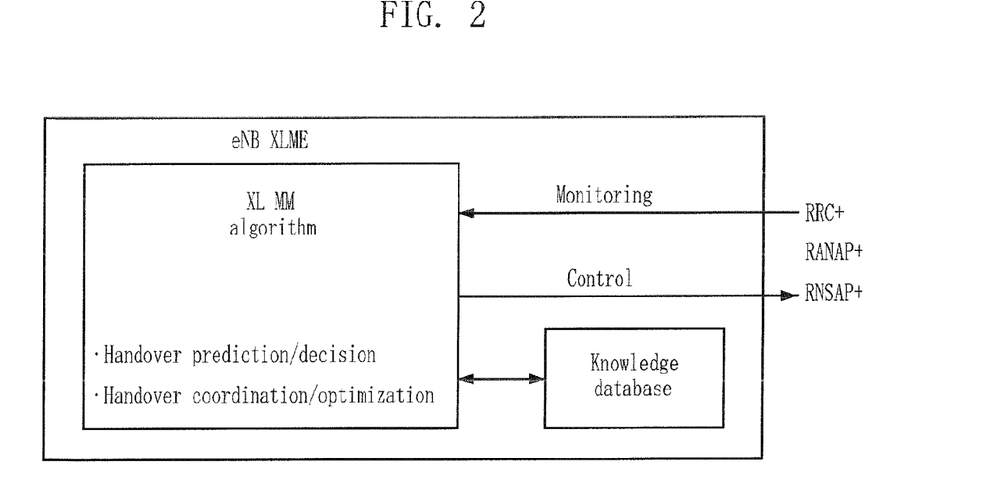
FIG. 2 is a diagram illustrating an example of the internal structure of a Cross-Layer Mobility Engine (XLME) module that is a mobility management engine of an eNB SCL, to which the present invention is applied.

FIG. 2 is a diagram illustrating an example of the internal structure of an XLME module that is a mobility management engine of an eNB SCL, to which the present invention is applied.

Referring to FIG. 2, the XLME module includes a Cross-Layer (XL) Mobility Management (MM) algorithm and a Knowledge DataBase (KDB).

The XL MM algorithm includes handover prediction and decision processes and handover coordination and optimization processes.

In the handover prediction and decision processes, a User Equipment (UE) uses a new reporting event capable of providing mobile direction information to enable a source eNB to predict a target handover cell, and the source eNB predicts and decides a target handover cell using a measurement report received from the UE.

At this point, the source eNB reduces the probability of a handover failure by monitoring of resources for a target eNB before the handover decision, and minimizes the handover interruption time of the UE by pre-synchronization between the UE and the target eNB after the handover decision.

In the handover coordination and optimization processes, the handover interruption time of the UE for a DownLink (DL) Constant Bit-Rate (CBR) traffic is minimized by the transmission timing optimization of a HandOver (HO) command of the source eNB, a packet retransmission for a handover is minimized by seamless ARQ continuation, and DL data transmission timing of "IU-UP+" is optimized for path switching in an Access GateWay (aGw), thereby preventing a DL packet disorder of the target eNB.

Figure 3:
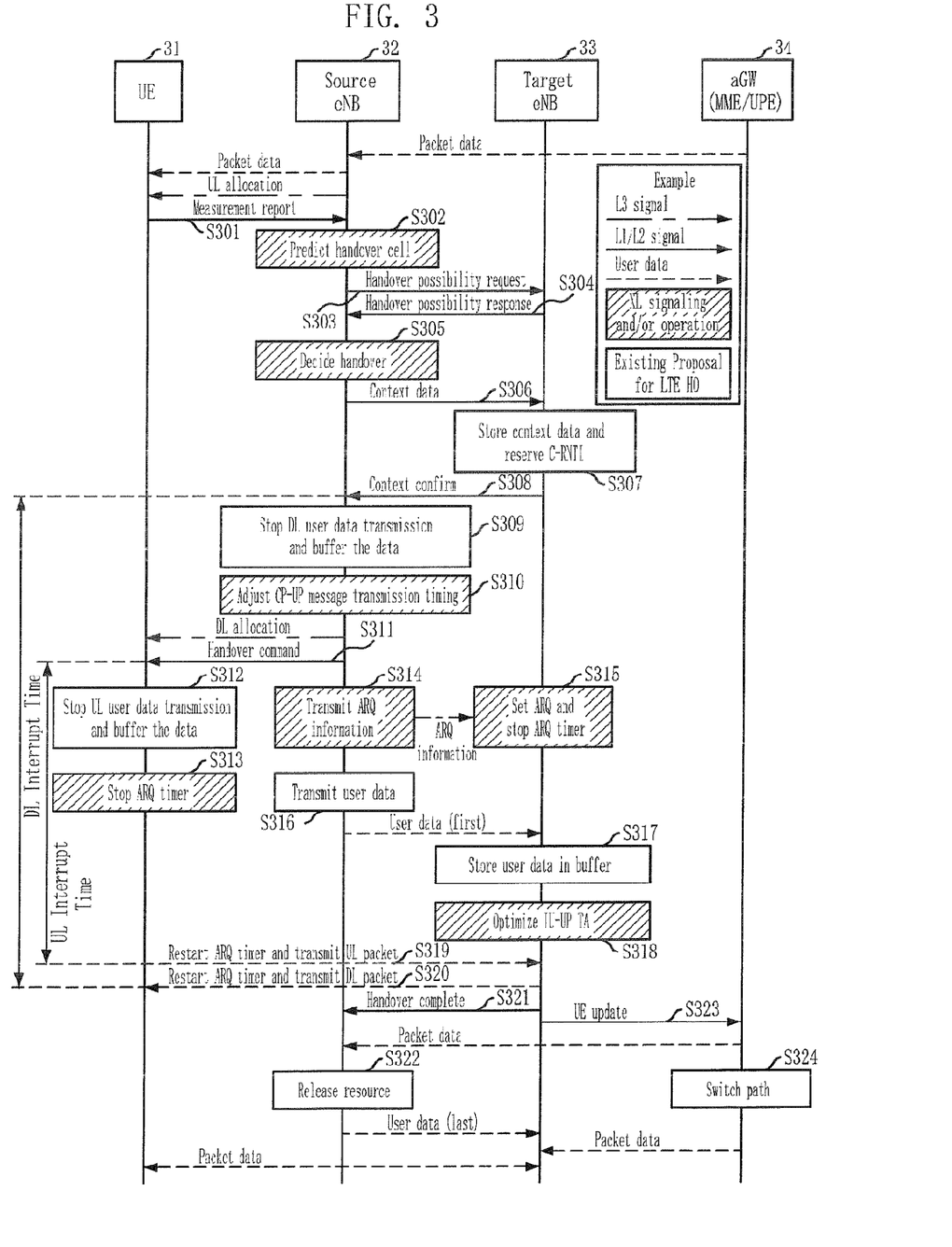
FIG. 3 is a flowchart describing a method for managing a cross-layer handover in accordance with an embodiment of the present invention.

FIG. 3 is a flowchart describing a method for managing a cross-layer handover in accordance with an embodiment of the present invention. FIG. 3 illustrates a handover procedure of an LTE system using an XL MM algorithm.

Referring to FIG. 3, in step S301, a User Equipment (UE) 31 is coordinated for a 3G LET system and transmits a Measurement Report message to a source evolved Node B (eNB) 32 according to measurement and reporting events added for prediction of a target handover cell.

That is, when a reporting event occurs, the UE 31 transmits a Measurement Report message having information used for prediction of a target handover cell, for example information about handover candidates, to the source eNB 32. A detailed description of a handover candidate generation process, a handover candidate management process, and reporting event generation conditions will be made below in association with measurement and measurement reporting processes in the UE 31.

In step S302, based on the Measurement Report message received from the UE 31, the source eNB 32 performs optimal handover cell prediction using a handover prediction algorithm.

That is, the source eNB 32 predicts an optimal handover cell using handover candidate information contained in the Measurement Report message received from the UE 31.

In step S303, the source eNB 32 transmits an HO Prerequest Message to a target eNB 33 in order to check the possibility of a handover to the target eNB 33 before the performance of a handover. Herein, the HO Pre-request message contains information about resources necessary for the UE 31.

In step S304, the target eNB 33 transmits an HO Preconfirm message or an HO Pre-reject message having its own resource information to the source eNB 32. Upon receipt of the HO Pre-reject message from the target eNB 33, the source eNB 32 uses a handover prediction algorithm to predict an optimal handover cell except a cell corresponding to the target eNB 33.

Afterward steps S303 and S304 make it possible to prevent a handover delay resulting from the handover rejection of the target eNB 33 at the final performance of a handover.

In step S305, the source eNB 32 finally decides to perform a handover upon receipt of the HO Pre-Confirm message from the target eNB 33. At this point, because the optimal handover cell has been predicted, the handover decision time can be advanced by the reporting event parameter adjustment of the UE 31, thereby enabling a rapid handover.

In step S306, the source eNB 32 transmits a Context Data message for a handover, for example the RAN context of the UE 31, to the target eNB 33. At this point, the source eNB 32 also transmits UE context information for pre-synchronization to the target eNB 33, together with the Context Data message.

In step S307, upon receipt of the Context Data message from the source eNB 32, the target eNB 33 stores the received Context Data message and reserves a new Cell-Radio Network Temporary Identity (C-RNTI) value.

In step S308, the target eNB 33 estimates Timing Advance (TA) and quality information of UpLink (UL) wireless channel between itself and the UE 31 to finally decide whether to accept a handover request, and transmits a Context Confirm message for a handover to the source eNB 32. At this point, because the target eNB 33 has already transmitted the HO Pre-confirm message, there is very little possibility that handover confirmation may fail.

Herein, the Context Confirm message contains a new Cell-Radio Network Temporary Identity (C-RNTI) value, the quality information of a UL wireless channel between the UE 31 and the target eNB 33, a Timing Advance (TA) value, and UL/DL resource information.

In step S309, upon receipt of the Context Confirm message from the target eNB 33, the source eNB 32 stops transmission of DL user data and buffers the data in a buffer before transmission of a Handover Command message to the UE 31, for rapid synchronization of the UE 31.

In step S310, the source eNB 32 adjusts the transmission timing of a Handover Command message to be optimal. For example, a cross-layer scheme is used to adjust the message transmission timing between a Control Plane (CP) and a User Plane (UP) to be mutually optimal. The transmission timing adjustment process will be described in detail in association with the following 'CP-UP adjustment process for optimization of DL CBR data transmission'.

In step S311, the source eNB 32 transmits a Handover Command message to the UE 31 in accordance with the adjusted optimal transmission timing. Herein, the Handover Command message contains the information contained in the Context Confirm message.

In step S312, upon receipt of the Handover Command message from the source eNB 32, the UE 31 stops transmission of UL user data and buffers the data in the buffer. At this point, because the transmission of both of the UL and DL user data have been stopped, the UE 31 is detached from the previous cell, i.e., the source eNB 32 and performs synchronization with a new cell, i.e., the target eNB 33 using the information contained in the received Handover Command message.

In step S313, the UE 31 temporality stops all Automatic Repeat request (ARQ) timers during the HO interruption time period for seamless ARQ continuation.

In step 314, the source eNB 32 receives and processes a piggybacked ACK having data or an ACK for the transmitted Handover Command message, and transmits ARQ-related information to the target eNB 33 for seamless ARQ continuation.

In step S315, upon receipt of the ARQ-related information from the source eNB 32, the target eNB 33 sets an ARQ according to the received ARQ-related information and stops all ARQ timers.

In step S316, the source eNB 32 transmits the UL/DL packets stored in a buffer and the currently-received UL/DL packets to the target eNB 33.

In step S317, the target eNB 33 stores the UL/DL packets received from the source eNB 32 in a buffer.

In step S318, the target eNB 33 sets Time Alignment (TA) of IU-UP+ for path switch to be optimal, in order to minimize the rearrangement of DL packets caused by packets received from an aGw 34 after the path switch.

That is, the target eNB 33 calculates a TA value for the aGW 34 based on the timing information of data transmission between the aGw 34 and the source eNB 32 and the timing information of data transmission between the source eNB 32a and the target eNB 33.

In step 319, because data can be transmitted upon completion of synchronization, the UE 31 restarts the stopped ARQ timers and transmits a UL piggypacketed packet to the target eNB 33 directly without the use of a separate HO Confirm message. At this point, the UL packet actually serves as the Handover Command message.

In step S320, upon receipt of the UL packet from the UE 31, the target eNB 33 restarts the stopped ARQ timers and transmits an ACK and buffered DL piggypacketed packets to the UE 31.

In step S321, the target eNB 33 transmits an HO Complete message to the source eNB 32.

In step S322, the source eNB 32 releases the resources used for data communication with the UE 31 in order to increase the resource efficiency. At this point, if there remain packets buffered in a DL buffer and packets received from the aGW 34, the source eNB 32 continues to transmit the remaining packets to the target eNB 33. Also, if a timer with a time value sufficiently larger than the path switch time of the aGW 34 is used, all the buffered packets can be safely transmitted to the target eNB 33 without the use of a separate message from the aGW 34.

In step S323, the target eNB 33 transmits a UE Update message for path switching to the aGW 34 with a Mobility Management Entity (MME) and a User Plane Entity (UPE). Herein, the UE Update message contains Time Alignment (TA) information for the path switching of the optimal timing.

In step S324, upon receipt of the UE Update message from the target eNB 33, the aGW 34 performs path switching from the source eNB 32 to the target eNB 33.

At this point, the TA information is transmitted to the IU-UP+ of the aGW 34 and the DL data transmission to the target eNB 33 is delayed for the corresponding time period. Therefore, the packet transmitted directly from the aGW 34 to the target eNB 33 due to the path switching arrives at the target eNB 33 later than the last packet transmitted from the aGW34 to the source eNB 32, thereby making it possible to minimize the generation of the packet rearrangement problem.

That is, the target eNB 33 needs not perform the packet rearrangement process because it receives the initial packet from the aGW 34 after receiving the last packet from the source eNB 32, i.e., the last packet transmitted from the aGW 34 to the source eNB 32.

Thereafter, the aGW 34 transmits DL data to the target eNB 33, and the target eNB 33 transmits the data received from the aGW 34 to the UE 31.

Hereinafter, a detailed description is given of the measurement and measurement reporting processes in the UE 31.

The UE 31 uses distance information according to signal strength.

That is, the UE 31 monitors the signal strength Ec/No of a Common PIlot Channel (CPICH) from the current cell and six neighbor cells (1-tier cell). Herein, the signal strength Ex/No in units of decibel (dB) can be expressed as the following Equation 1.

$$E_c/N_o(dB) = 10 \log 10(P_{rx}/(N_{if}+N_{bg(rx)}))$$  Eq. 1 where $P_{rx}$ denotes RX power, $N_{if}$ denotes an interference noise, and $N_{bg(rx)}$ denotes an RX background noise.

Because information about the distance between the UE 31 and the eNB of each neighbor cell is needed for the handover prediction of the source eNB 32, the signal strength Ex/No in units of watt (W) not decibel (dB) can be expressed as the following Equation 2.

$$E_c/N_o(W) = P_{rx}/(N_{if} + N_{bg(rx)})$$ Eq. 2

Herein, $P_{rx}$ is inversely proportional to a path loss and the distance is proportional to the path loss. Thus, an assumption is made as the following Equation 3.

$$P_{rx} \propto 1/L_p \propto 1/d^2$$ Eq. 3 where $L_p$ denotes a path loss and d denotes a distance.

The distance $d_{ss}$ depending on the signal strength is defined as the following Equation 4.

$$d_{ss} = 1/(E_c/N_o(W))^{-1/2}$$ Eq. 4

Also, the parameters used for the handover prediction and measurement reporting processes are defined as follows:

$Th_{act}$: an $E_c/N_o$ value (W) allowing communication at a designated error rate or less. That is, if $(E_c/N_o \text{ (CPICH)}) \geq Th_{act}$, a handover is possible.

$Th_{alert}$: $Th_{act} - \Delta s$. If $E_c/N_o = Th_{alert}$, a handover is not yet possible. However, it is the time point when a handover is expected to occur if $E_c/N_o$ continue to increase.

$t_{dur}$: The time average measurement interval for the signal strength of each cell used for determination of the best candidate set.

Meanwhile, a reporting event for determining whether to transmit a Measurement Report message is as follows:

First, an HO candidate set is defined as a handover target set used for handover prediction.

An HO candidate set $C_{HO}$ is the ordered set of handover target cells, which includes the following two types: $C_{HO(SS)}$ and $C_{HO(RE)}$.

First, $C_{HO(SS)}$ based on the signal strength has elements of three cells with the largest signal strength average $\overline{SS}$ among 1-tier cells. At this point, the $\overline{SS_i}$ measurement causes a rapid signal change due to the characteristics of a multi-path channel, it takes CPICH $E_c/N_o$ $(=f_{MA}(E_x/N_o))$ having passed through a corresponding MA filter.

Second, $C_{HO(RE)}$ based on route estimation is a cell with the largest signal strength average difference $\Delta \overline{SS}$. At this point, the $\Delta \overline{SS}$ measurement takes $f_{MA}((k \cdot E_c/N_o(W))^{-1/2})$ having passed through a corresponding MA filter for the distance information $(k \cdot E_c/N_o(W))^{-1/2}$.

Third, a potential handover candidate set $P_{HO}$ is the ordered set of handover-possible cells satisfying the conditions of | $\overline{SS_i} \geq Th_{act}$ capable of communication at a designated error rate or less, the elements of which are sequentially denoted as $\{p_{HO-1}, p_{HO-2}, \ldots\}$.

These handover candidate sets are managed as follows.

The UE 31 calculates the time average $\overline{SS_i}$ for three 1-tier cells monitored at time intervals of $t_{dur}$ to manage three cells as $C_{HO(SS)}$ in descending order of the $\overline{SS_i}$ value.

Also, the UE 31 calculates the $|\Delta \overline{SS} = \overline{SS_i} - \overline{SS_{i-1}}|$ value to manage a cell with the largest value as $C_{HO(RE)}$.

The reporting event used for the measurement report of the UE 31 is as follows:

Event R1: The case when there is a change in $C_{HO(SS)}$, where the $\overline{SS_i}$ value (dB) of each element and $C_{HO(SS)}$ are reported.

Event R2: The case when there is a change in $C_{HO(RE)}$, where the $\overline{SS_i}$| value (dB) of each element and $C_{HO(RE)}$ are reported.

Event R3: The case when there is a change in $P_{HO}$, where the $\overline{SS_i}$ value (dB) of each element and $P_{HO}$ are reported.

Event R4: When the $\overline{SS_i}$ value (dB) of the current cell exceeds the prediction threshold $Th_{pred}$, this fact is reported.

Event 1D': The event that occurs without consideration of a hysteresis margin and a time-to-trigger, i.e., $Th_{hys}$ (Threshold hysteresis margin)=0, $\Delta$=0, immediately when a cell having a larger measurement value than the currently optimal cell is detected, where the optimal cell is updated and the $\overline{SS_i}$ value (dB) of each element and $C_{HO(SS)}$ are reported.

In addition, an event 1D (Best Cell Change) used in the Universal Mobile Telecommunications System (UMTS) report may be used as it is. In this case, the threshold $Th_{hys}$ and the time-to-trigger $\Delta t$ are used in the same manner as in the UMTS report.

Herein, $t_{dur}$ and $\Delta t$ have the relationship of $\Delta t > n \cdot t_{dur}$, where $\min(\Delta t) = n \cdot t_{dur}$, $\max(t_{dur}) = \Delta t/n$, and n is determined to be between 3 and 5. Also, $Th_{hys}$ and $\Delta t$ are adjusted by the XL algorithm of the eNB.

Hereinafter, the handover prediction/decision process in the source eNB 32 will be described in more detail.

Upon receipt of a Measurement Report message having HO Candidate Cell information from the UE 31, the source eNB 32 decides the best HO candidate cell (bHO) through the following handover prediction/decision algorithm. Herein, the prediction means the process of searching and updating the optimal handover candidate cell and the case of the change of the optimal cell during the updating process is called the decision.

| Handover Prediction/Decision Algorithm |
| --- |
| Algorithm UpdatebHO; <br> $b_{HO} \leftarrow$ NULL; <br> if $((c_{HO(RE)} = c_{HO(SS)-1} = c_i)$ and $(SS(c_i) \geq Th_{alert})$ <br> then <br>     $b_{HO} \leftarrow c_i$ <br>     else if $((c_{HO(RE)} = c_i)$ and $(c_i \in P_{HO}))$ then <br>         $b_{HO} \leftarrow c_i$ <br>     else if $((c_{HO(SS)-1} = p_{HO-1} = c_i)$ and then <br>         $b_{HO} \leftarrow c_i$ <br>     endif <br>   endif <br> endif |

Figure 4A:
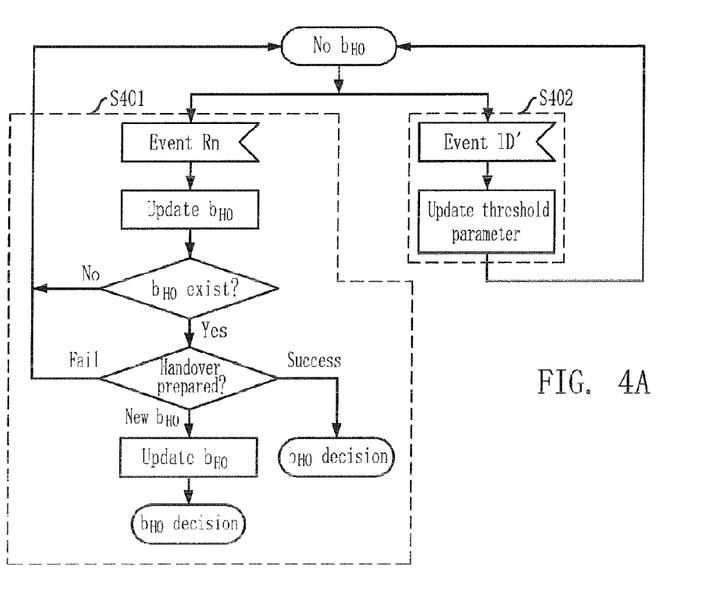
FIGS. 4A and 4B are flowcharts describing a handover prediction and decision processes in accordance with an embodiment of the present invention.
Figure 4B:
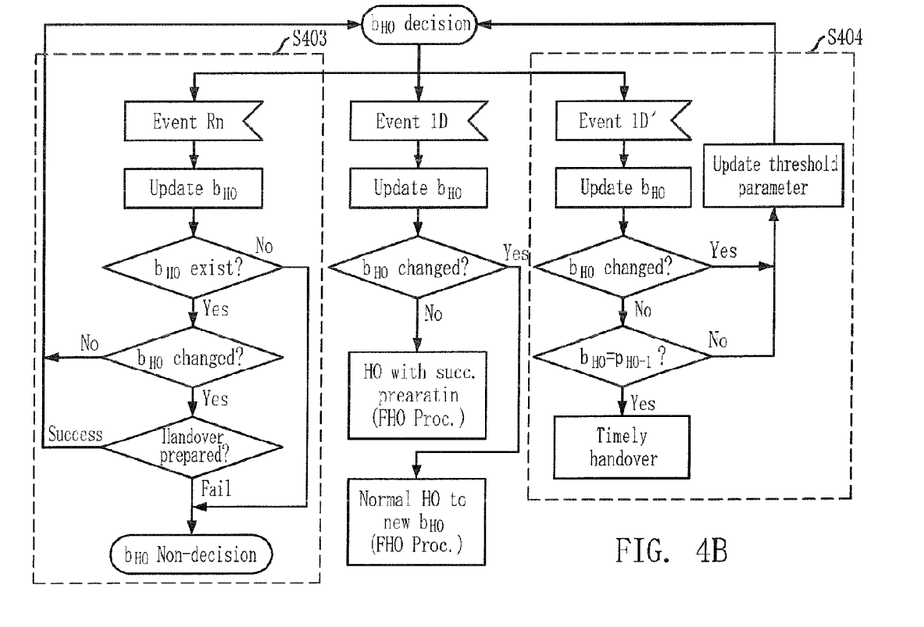

FIGS. 4A and 4B are flowcharts describing a handover prediction and decision processes in accordance with an embodiment of the present invention. That is, FIG. 4 illustrates a process operation according to each reporting event (R1/R2R3, 1D, 1D') depending on whether the best handover candidate cell is decided.

Referring to FIG. 4A, if a Measurement Report message corresponding to an event Rn (R1, R2, R3) is received under the condition that the best handover cell $b_{HO}$ has not yet been decided, then the best handover cell is decided through the 'UpdatebHO' algorithm and a handover preparing operation is performed, at step S401.

On the other hand, if an event 1D' is received at a cell boundary under the condition that the best handover cell $b_{HO}$ has not yet been decided, then handover-related threshold parameters are updated and the next event is waited for, at step S402.

Referring to FIG. 4B, if the best handover cell $b_{HO}$ has been decided, then an event 1D' is waited for after a handover preparing operation is completed.

However, depending on the movement of the UE 31, another event R1, R2 or R3 may be received before the event 1D'. In this case, the best handover cell $b_{HO}$ is again updated through the 'UpdatebHO' algorithm. At this point, if the best handover cell $b_{HO}$ cannot be determined, the handover preparing operation is abandoned to return to the condition that the best handover cell $b_{HO}$ has not been decided. If the best handover cell $b_{HO}$ is changed, a handover preparing operation for the new best handover cell $b_{HO}$ is performed at step 403.

Meanwhile, if an event 1D' is received under the condition that the best handover cell $b_{HO}$ has been decided, then the best handover cell $b_{HO}$ is again updated. If the best handover cell $b_{HO}$ is changed, because it is the case of the unpredictable movement at a cell boundary, the start of the handover process is postponed until receipt of an event 1D. On the other hand, if the best handover cell $b_{HO}$ is not changed, the handover process is started immediately after a target cell outputs the handover-possible signal strength. If the handover-possible signal strength is not output, the start of the handover process is postponed until receipt of an event 1D at step S404.

Meanwhile, when the handover process is started, 'UE Context' information is provided to the target cell and the new UE C-RNTI, Timing Advance (TA), and UL/DL resources are received from the target cell. Therefore, if a handover occurs frequently due to false handover prediction, i.e., false alarm, the system performance may degrade due to the frequent handover and the waste of resources.

However, the prediction algorithm cannot perfectly prevent such 'false alarm'. Thus, if 'false alarm' occurs, it is stored in a knowledge database (KDB). Thereafter, before the performance of a handover according to an event 1D', it is checked whether the movement pattern of the UE 31 corresponds to such 'false alarm'. At this point, if the movement pattern of the UE 31 is similar to the pattern corresponding to the recent 'false alarm', the best handover cell $b_{HO}$ is abandoned and a general handover process is performed with the maximum handover threshold parameters.

Also, if the UL transmission from the UE 31 to the source eNB is not stopped even during the operation of the handover process according to an event 1D', a Measurement Report message can be received continuously.

Thus, upon receipt of an event 1D', R1, R2, or R3, the source eNB 32 updates the best handover cell $b_{HO}$. If the best handover cell $b_{HO}$ is changed, the source eNB 32 regards the case as 'false alarm' and stores the movement information of the UE 31 in the knowledge database (KDB). Herein, the case where the source eNB receives the event 1D means the normal case where the handover prediction is successful.

Figure 5:
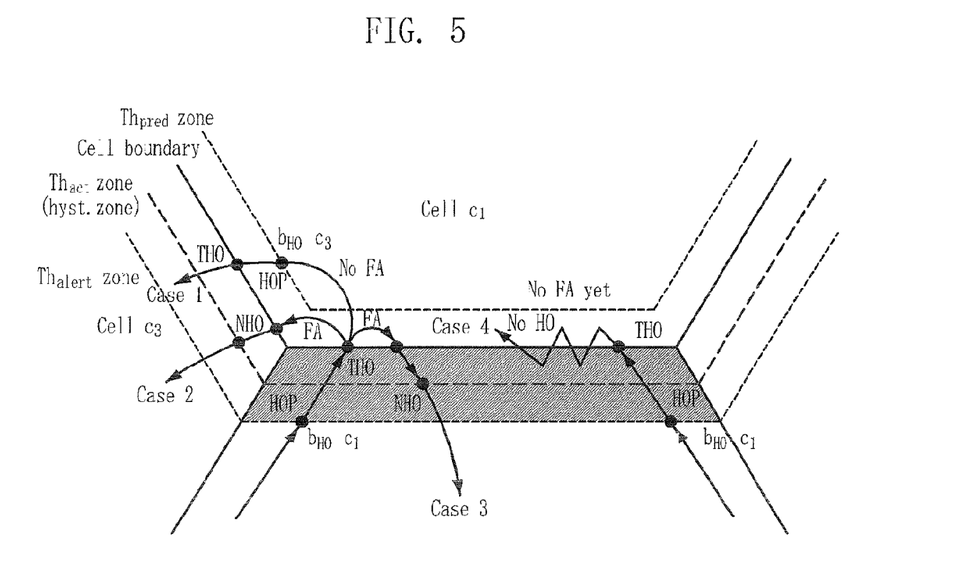
FIG. 5 is a diagram illustrating a 'false alarm' generation state in a prediction algorithm in accordance with an embodiment of the present invention.

FIG. 5 is a diagram illustrating a 'false alarm' generation state in a prediction algorithm in accordance with an embodiment of the present invention.

In general, 'false alarm' is generated when the UE again performs a handover to another cell before entry into a $Th_{pred}$ region after the performance of a handover. Herein, Cases 2 and 3 correspond to 'false alarm', while Case 1 does not correspond to 'false alarm' because a handover is again performed after entry into the $Th_{pred}$ region.

Case 4 corresponds to the case of 'ping-pong' across the boundary of two cells. Although 'false alarm' is not yet generated, it is generated in case of entry into another cell. However, in case of waiting at the region for a predetermined time or more, 'false alarm' may not be generated.

In order to solve such problem, if the algorithm gives a false alarm due to the unpredictable movement pattern of the UE 31, such information is stored in the database. If the UE exhibits a movement pattern similar to that stored in the database, an unnecessary handover can be minimized by the adjustment of the HO threshold not by the use of the prediction algorithm.

Figure 6A:
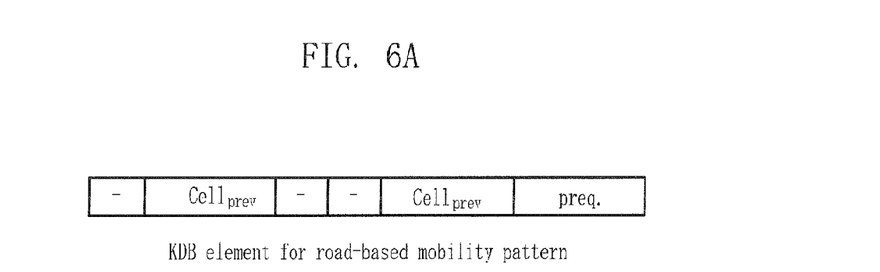
FIGS. 6A and 6B are diagrams illustrating a knowledge database (KDB) structure with two patterns in accordance with an embodiment of the present invention.
Figure 6B:
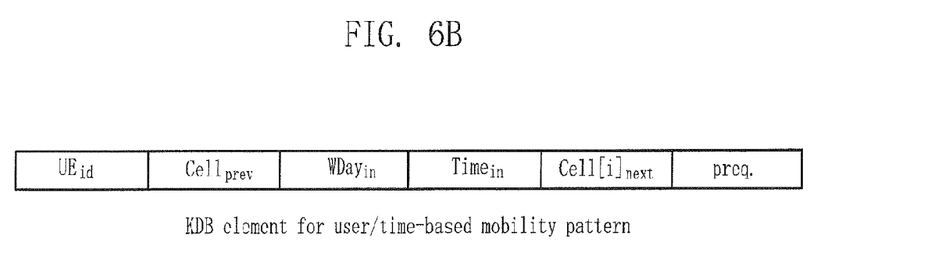

FIGS. 6A and 6B are diagrams illustrating a KDB structure with two patterns in accordance with an embodiment of the present invention. FIG. 6A illustrates a road-based mobility pattern, while FIG. 6B illustrates a time-based mobility pattern having the time information and UE ID of each user.

The KDB information is managed by the eNB. If the moving UE fails in the handover prediction due to the generation of 'false alarm' conditions, the related information is written or updated in the KDB.

If the target eNB 33 receives a 'Preparation Request' message from the source eNB 32 during the handover preparation period, it compares the corresponding request information with the corresponding information stored in the KDB element. If the request information is identical to the information stored in the KDB element, the corresponding request is rejected and a cell written in 'Cellnext' is recommended as a handover cell. Thereafter, the eNB 32 re-transmits a Preparation Request' message to the recommended handover cell or stops the handover preparation process and performs a handover according to a general procedure.

Hereinafter, the handover coordination and optimization algorithms in the source eNB 32 will be described in more detail.

For minimization of a data transmission interruption time in a handover process, a lossless handover, and minimization of packet duplication and reordering, the handover coordination and optimization algorithms perform optimization operations, such as adjustment of the user data and the control message and adjustment of the lower-layer protocol, using the cross-layer scheme.

That is, the handover coordination and optimization algorithms perform three coordination and optimization processes: Control Plane-User Plane (CP-UP) coordination for DownLink (DL) Constant Bit Rate (CBR) data transmission optimization, seamless ARQ continuation, and 'IU-UP+ TA' coordination for the best path switching.

First, a description is given of the CP-UP coordination process for the DL CBR data transmission optimization.

The 3G LTE system uses a hard handover and thus a data transmission interruption may occur during the handover process. The data transmission interruption during the handover process will be referred to as a handover interruption. The minimization of the handover interruption is important in the LET handover scheme.

Transmission can be controlled by the source eNB 32 together with a Handover Command message in the case of DL data transmission, and an inter-packet time can be predicted in the case of CBR data transmission. Therefore, the handover interruption time can be minimized by the transmission timing control of the Handover Command message through the CP-UP coordination.

Figure 7:
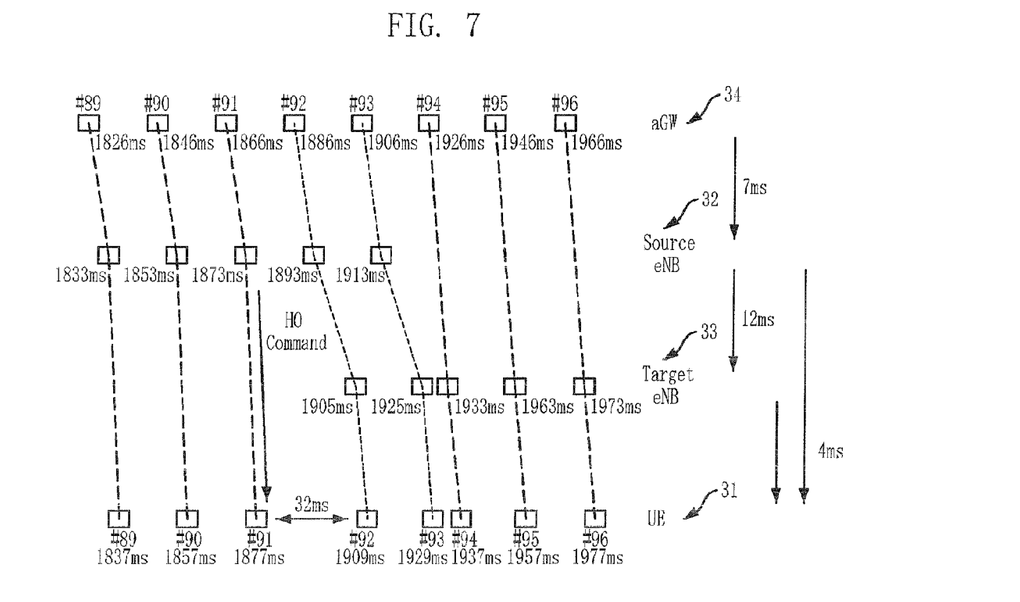
FIG. 7 is a diagram illustrating the minimization of a handover interruption time when a Handover (HO) Command message is transmitted immediately after DL packet transmission, in accordance with an embodiment of the present invention.
Figure 8:
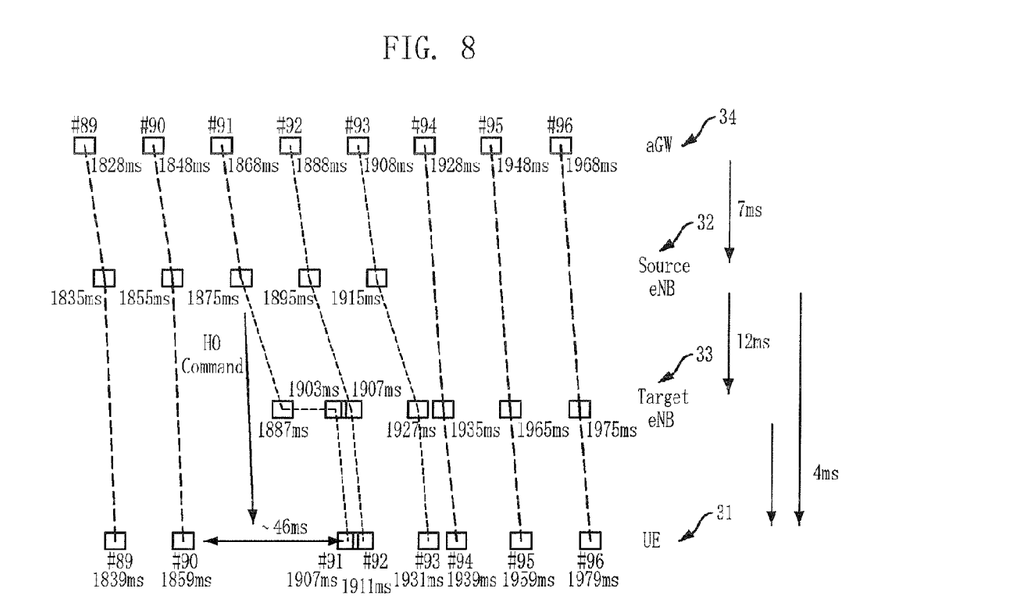
FIG. 8 is a diagram illustrating the minimization of a handover interruption time when a Handover Command message is transmitted before DL packet transmission, in accordance with an embodiment of the present invention.

FIG. 7 is a diagram illustrating the case where a Handover Command message is transmitted immediately after DL packet transmission. FIG. 8 is a diagram illustrating the case where a Handover Command message is transmitted before DL packet transmission.

As can be seen from FIGS. 7 and 8, an inter-packet time of a packet received at the UE 31 increases with an increase in the time period from the transmission of the DL packet to the transmission of the Handover Command message, because DL data transmission is interrupted after transmission of a Handover Command message.

Thus, the handover interruption time depending on the transmission timing of the Handover Command message can be reduced if the Handover Command message is transmitted immediately after the transmission of the DL packet as illustrated in FIG. 7.

Because the inter-packet time is difficult to predict in the case of Variable Bit Rate (VBR) traffic or bursty traffic, it is more preferable for Constant Bit Rate (CBR) traffic.

In order to transmit a Handover Command message from the source eNB 32 immediately after transmission of DL data, the time to transmit the Handover Command message is determined according to the following procedure using a cross-layer interface, so that the Radio Resource Control+ (RRC+) protocol of the Control Plane (CP) can know the user data transmission time point of the Radio Link Control (RLC) protocol of the User Plane (UP).

First, the source eNB 32 finally decides to perform a handover through the handover prediction and decision algorithms, and transmits a Context Data message to the target eNB 33.

At this point, the RRC+ of the source eNB 32 transmits a Downlink Check Request message to the RLC.

Upon receipt of the Downlink Check Request message from the RRC+ of the source eNB 32, the RLC of the source eNB 32 transmits a Downlink Check Response message to the RRC+ of the source eNB 32 every time when a User Plane (UP) message is transmitted.

Thereafter, the source eNB 32 receives a Context Confirm message from the target eNB 33, prepares transmission of the Handover Command message, and waits for a Downlink Check Response message from the RLC. Herein, if the inter-packet time of CBR traffic is denoted by $t_{CBR}$, the maximum wait time becomes $2\, t_{CBR}$.

Thereafter, if the RRC+ of the source eNB 32 receives a Downlink Check Response message from the RRC of the source eNB 32 within the $2t_{CBR}$ time or if the $2t_{CBR}$ time elapses after the failure of receipt of the Downlink Check Response message within, it immediately transmits a Handover Command message to the UE 31.

Hereinafter, a description is given of the seamless ARQ continuation.

If data transmission is interrupted in the 3G LTE system during a handover process, an RLC protocol may fail to receive an ACK signal for data transmitted in an Acknowledge Mode (AM) and thus the data must be retransmitted after the handover process. In this case, there are problems such as the waste of resources due to the retransmission and the delay of a data transmission restart time.

The seamless ARQ continuation minimizes the problems such as the retransmission and the time delay generated when the RLC ARQ protocol is initialized or affected by a handover process, thereby optimizing the handover performance using the cross-layer scheme so that no other problems, except the data transmission interruption time by the handover process in the UE 31, are generated even when the handover process is performed.

A seamless ARQ continuation process in the DownLink (DL) data transmission and the UpLink (UL) data transmission are performed as follows.

Figure 9:
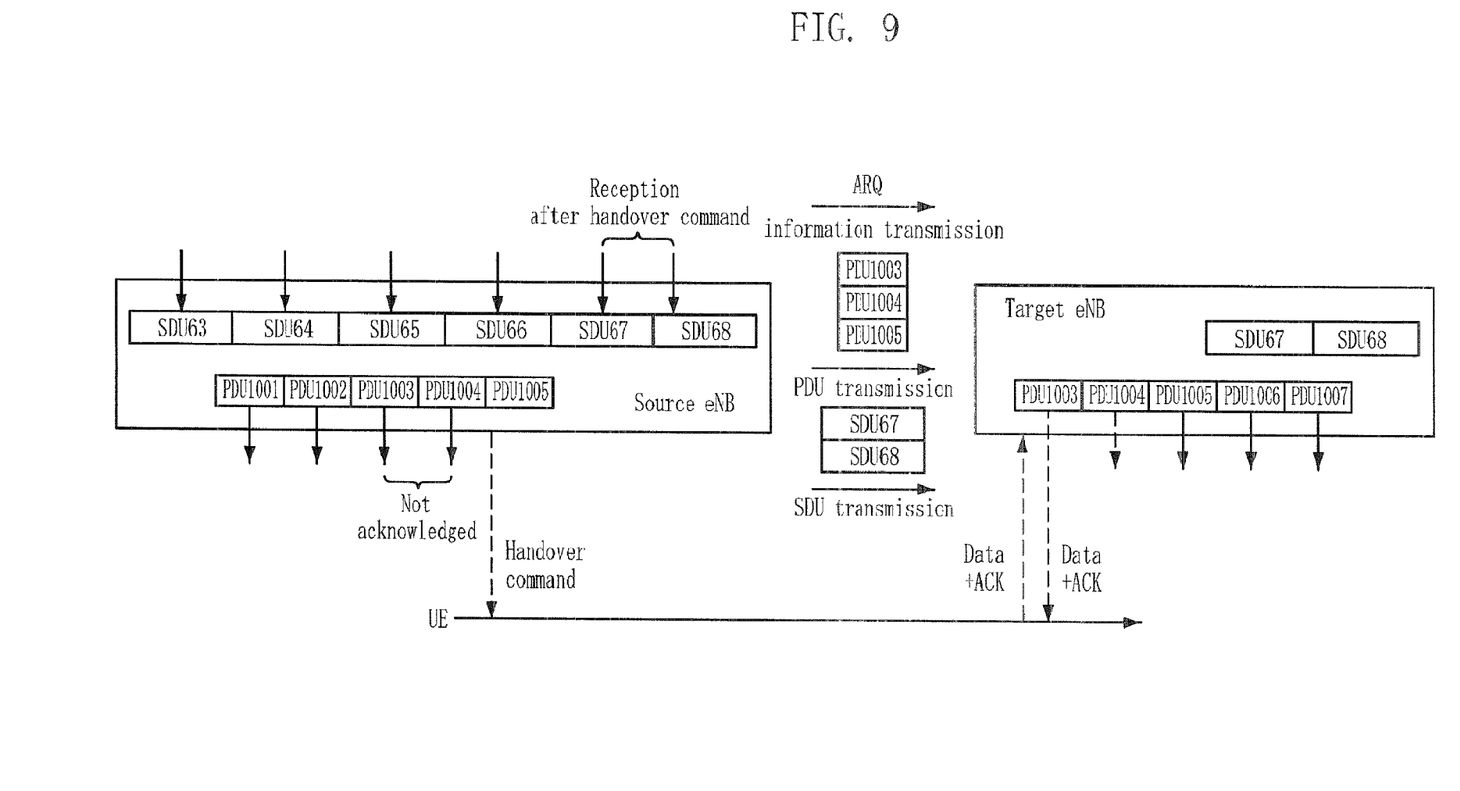
FIG. 9 is a diagram illustrating a seamless Repeat reQuest (ARQ) continuation process in DL data transmission in accordance with an embodiment of the present invention.

FIG. 9 is a diagram illustrating a seamless ARQ continuation process in DL data transmission in accordance with an embodiment of the present invention.

Referring to FIG. 9, upon receipt of a Context Confirm message from the target eNB 33, the source eNB 32 transmits a Handover Command message according to CP-UP coordination for CBR data immediately after Packet Data Unit (PDU) transmission, and stops transmission of DL data.

At this point, the following packets are present in an RLC buffer.

PDU that has not yet been acknowledged
Service Data Unit (SDU) that has not been acknowledged completely
PDU that has not yet been transmitted Thereafter, the corresponding DL data continue to be transmitted from the access GateWay (aGW) to the source eNB 32. At this point, the SDU are also present in the RLC buffer.

That is, the RRC+ of the source eNB 32 transmits an ARQ Forward Request message to the RRC of the source eNB 32 through the cross-layer interface after transmission of a Handover Command message. Then, the RLC of the source eNB 32 stops transmission of DL data, pends each timer of the ARQ after the delay time of $t_{pmax}$, i.e., UE-source eNB 32 maximum propagation time, in order to receive an ACK message for data transmitted before the handover command from the UE 31, and transmits ARQ-related management and control parameter values including the rest time value of each timer to the RLC of the target eNB 33 through an ARQ Information message including all DL/UL information.

Thereafter, the RRC+ of the source eNB 32 transmits all PDU and SDU packets currently contained in the buffer to the RLC of the target eNB 33.

Upon receipt of the ARQ Information message from the source eNB 32, the RLC of the target eNB 33 transmits an ARQ Forward Indicate message to the RRC+ of the target eNB 33 and sets its own state in accordance with the received ARQ information. At this point, each timer of the ARQ maintains a pending state.

Upon receipt of the Handover Command message, the UE 31 stops transmission of a UL packet and pends ARQ timers. Thereafter, the UE 31 performs synchronization for a handover and when ready for data transmission, restarts the ARQ timers and transmits the next UL packet to the target eNB 33. At this point, an ACK for DL packet is transmitted along with UL packet by piggybacking.

Upon receipt of the packet from the UE 31, the target eNB 33 restarts an ARQ timer to transmit the next DL packet in a normal ARQ scheme.

This process prevents the DL data retransmission caused by the handover.

Figure 10:
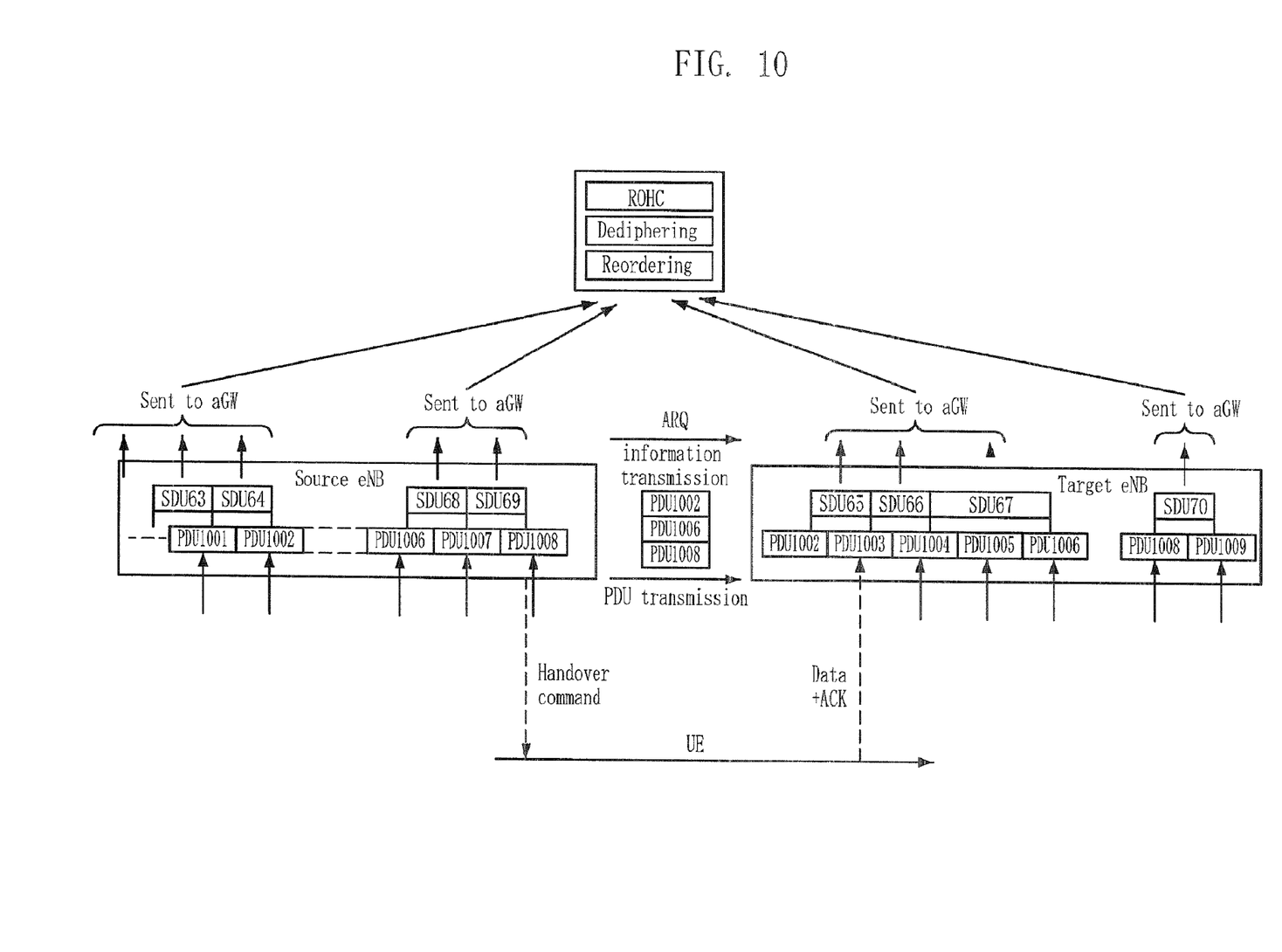
FIG. 10 is a diagram illustrating a seamless ARQ continuation process in UL data transmission in accordance with an embodiment of the present invention.

FIG. 10 is a diagram illustrating a seamless ARQ continuation process in UL data transmission in accordance with an embodiment of the present invention.

Referring to FIG. 10, the source eNB 32 transmits a normally-acknowledged SDU to the aGW 34.

In a handover process, a packet cannot be received from the UE 31 within the $t_{pmax}$ time even after an Handover Command message is transmitted to the UE 31. If the received packet has no error, the corresponding SDU can be transmitted to the aGW 34. If the RLC protocol operates in an Acknowledged Mode (AM), an ACK must be transmitted with respect to the received packet but the source eNB 32 cannot transmits the ACK because the DL data transmission has already been interrupted.

The source eNB 32 transmits a Handover Command message to the UE 31, pends each timer of the ARQ after the time period $t_{pmax}$, and transmits an ARQ Information message having ARQ-related information to the target eNB 33.

Upon receipt of the ARQ Information message from the source eNB 32, the RLC of the target eNB 33 sets its own state in accordance with the received ARQ information and maintains the pending state of each timer of the ARQ.

Upon receipt of the Handover Command message, the UE 31 stops transmission of a UL packet and pends ARQ timers. Thereafter, the UE 31 performs synchronization for a handover and when ready for data transmission, restarts the ARQ timers and transmits the next UL packet to the target eNB 33.

Upon receipt of the packet from the UE 31, the target eNB 33 restarts an ARQ timer, transmits an ACK to the UE 31 in a normal ARQ scheme, and transmits the completed SDU to the aGW 34.

This process prevents the UL data retransmission caused by the handover.

Hereinafter, a description is given of the IU-UP+ TA coordination for the best path switching.

The UE 31 performs a handover from the source eNB 32 to the target eNB 33 to transmit the first UL packet to the target eNB 33. Upon receipt of the first UL packet from the UE 31, the target eNB 33 transmits a Handover Command message to the source eNB 32 and requests path switching to the aGW 34.

Thereafter, when the path switching is performed by the aGW 34, the DL data from the aGW 34 are transmitted directly to the target eNB 33, not to the source eNB 32.

Thus, the target eNB 33 receives all of the DL data from the source eNB 32 and the DL data from the aGW 34.

As illustrated in FIG. 7, if the inter-packet time of the DL packet is sufficient, the order of packets received by the target eNB 33 through the path of 'aGW→source eNB→target eNB' and the path of 'aGW→target eNB' does not change.

However, if the DL traffic satisfies the following condition, the order of packets received by the target eNB 33 may change and thus the target eNB 33 or the UE 31 must reorder the received packets before transmission to the UE 31.

Condition $$t_{ip} < t_{aGW\text{-}seNB} + t_{seNB\text{-}teNB} - t_{aGW\text{-}teNB}$$

$t_{ip}$: the inter-packet time of DL traffic $t_{aGW\text{-}seNB}$: the propagation delay and processing time for transmission between the aGW and the source eNB $t_{aGW\text{-}teNB}$: the propagation delay and processing time for transmission between the aGW and the target eNB $t_{seNB\text{-}teNB}$: the propagation delay and processing time for transmission between the source eNB and the target eNB If $t_{aGW\text{-}seNB} = t_{aGW\text{-}teNB}$, the above condition can be simplified as $t_{ip} < t_{seNB\text{-}teNB}$. That is, if the inter-packet time of DL traffic has a small value of 10 ms or less, the order of DL packets received by the target eNB 33 changes due to a handover process.

Thus, the Timing Alignment (TA) function of an IU-UP+ protocol between the target eNB 33 and the aGW 34 is used to optimize the transmission time of DL packets after the path switching at the aGW 34.

That is, the RLC of the source eNB 32 transmits an ARQ Information message having the transmission time information to the RLC of the target eNB 33.

Upon receipt of the ARQ Information message from the RLC of the source eNB 32, the RLC of the target eNB 33 detects the reception time, calculate the transmission delay time $t_{seNB\text{-}teNB}$, and transmits the calculated the transmission delay time $t_{seNB\text{-}teNB}$ to the RRC+ through an ARQ Forward Indicate message. At this point, if the source eNB 32 is time-synchronized with the target eNB 33, the transmission delay time $t_{seNB\text{-}teNB}$ can be used for optimization of the DL packet transmission timing for the path switching.

Thereafter, the target eNB 33 transmits a Handover Complete message to the source eNB 32, and transmits a UE Update message to the aGW 34 to request path switching. At this point, the target eNB 33 transmits also the transmission delay time $t_{seNB\text{-}teNB}$ as the TA coordination information.

Upon receipt of the UE Update message from the target eNB 33, the aGW 34 transmits a TA Request message having the information of the transmission delay time $t_{seNB\text{-}teNB}$ to the IU-UP+.

Upon receipt of the TA Request message, the IU-UP+ of the aGW 34 starts a timer $T_{TA}$ set to the $t_{seNB\text{-}teNB}$ value so that data are not transmitted during the transmission delay time $t_{seNB\text{-}teNB}$.

Thereafter, when the timer $T_{TA}$ is terminated after the path switching by the aGW 34, the IU-UP+ of the aGW 34 can transmit the packet stored in a buffer to the target eNB 33.

If the DL traffic does not satisfy the condition of $t_{ip} < t_{seNB\text{-}teNB}$, no DL packet is present in the buffer of the IU-UP+ and thus the TA performance of the aGW 34 does not affect the transmission of DL data.

The technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

As described above, the present invention can optimize the handover performance of a mobile communication system by providing rapid and reliable handover decision, minimization of a data interruption time caused by a handover, a handover without a data loss, and a handover with minimized data retransmission and rearrangement by using a cross-layer scheme and a mobility prediction scheme in the mobile communication system employing a hard handover.

Also, the present invention is expected to contribute to the successful development of the 3G LTE system. For example, the present invention can be applied to a handover in the next-generation 4 G communication system and to a handover between heterogeneous networks.

While the present invention has been described with respect to the specific embodiments, it will be apparent to those skilled in the art that various changes and modifications may be made without departing from the spirit and scope of the invention as defined in the following claims.

What is claimed is:

1. A method for managing a cross-layer handover in a user equipment, the method comprising the steps of:
   managing a predetermined number of neighbor cells as a handover candidate set based on signal strength and route estimation;
   transmitting a Measurement Report message having the handover candidate set information to a source base station according to a reporting event; and
   performing a handover according to a Handover Command message received from the source base station;
   wherein the step of performing the handover includes the steps of:
   stopping Automatic Repeat request (ARQ) timers temporarily and performing synchronization with a target base station, upon receipt of the Handover Command message from the source base station;
   restarting the stopped ARQ timers and directly transmitting an uplink packet to the target base station without using a handover confirm message, upon completion of the synchronization with the target base station; and
   receiving a response message for the uplink packet and a buffered downlink packet from the target base station.

2. The method of claim 1, wherein the step of performing the synchronization with the target base station includes the steps of:
   stopping and buffering transmission of uplink user data according to the Handover Command message;
   separating from the source base station and performing the synchronization with the target base station using information included in the received Handover Command message; and
   stopping an ARQ timer temporarily during a handover interruption time period.

3. The method of claim 1, wherein the step of transmitting the Measurement Report message includes the steps of:

if the signal strength average value of the current cell exceeds a prediction threshold value, reporting the fact to the source base station; and updating the best cell and reporting the corresponding cell information and the signal strength average value of each cell, without considering a hysteresis margin and a time-to-trigger, immediately at the time point when a cell exceeding the measurement value of the current best cell is detected.

4. The method of claim 1, wherein the Handover Command message includes one or more selected from the group consisting of a Cell-Radio Network Temporary Identity value, information about the quality of an uplink wireless channel between the user equipment and a target base station, a Timing Advance value, and information about uplink and downlink resources.

5. A method for managing a cross-layer handover in a user equipment, the method comprising the steps of:

managing a predetermined number of neighbor cells as a handover candidate set based on signal strength and route estimation;

transmitting a Measurement Report message having the handover candidate set information to a source base station according to a reporting event; and performing a handover according to a Handover Command message received from the source base station;

wherein the step of managing the handover candidate set includes the steps of:

managing, based on signal strength, a predetermined number of cells with largest average signal strengths $\overline{SS}_i$ among the neighbor cells as a signal strength-based handover candidate set;

managing, based on route estimation, a cell with the largest average signal strength difference $\Delta\overline{SS}=\overline{SS}_i-\overline{SS}_{i-1}$ among the neighbor cells as a route estimation-based handover candidate; and managing a set of cells capable of communication at a predetermined error rate or less among the neighbor cells as a potential handover candidate set, wherein each cell in said potential handover candidate set satisfies the following relationship $\overline{SS}_i \geq Th_{act}$ where $Th_{act}$ is an $E_c/N_o$ value allowing communication at the predetermined error rate or less.

6. The method of claim 5, wherein the step of transmitting the Measurement Report message includes the steps of:

reporting the corresponding cell information and the signal strength average value of each cell if the signal strength-based handover candidate set is changed;

reporting the corresponding cell information and the signal strength average difference value of each cell if the route estimation-based handover candidate is changed; and reporting the corresponding cell information and the signal strength average value of each cell if the potential handover candidate set is changed.

7. A method for managing a cross-layer handover in a base station, the method comprising the steps of:

predicting, by a source base station, a handover cell using information about a handover candidate set received from a user equipment;

deciding, by the source base station, a handover according to a Handover Confirm message received from a target base station in the predicted handover cell;

transmitting a handover command from the source base station to the user equipment; and calculating, by the target base station, a time alignment value for a gateway, transmitting the calculated time alignment value to the gateway, transmitting a downlink packet to the user equipment, and completing the handover;

wherein the step of completing the handover includes the steps of:

receiving ARQ-related information and a packet by the target base station from the source base station, stopping an ARQ timer of the target base station, calculating a time alignment value based on data transmission timing information, and transmitting the calculated time alignment value to the gateway;

restarting the stopped ARQ timer of the target base station upon receipt of an uplink packet from the user equipment and transmitting a response message for the received uplink packet and a buffered downlink packet to the user equipment;

releasing resources used for data transmission between the source base station and the user equipment upon receipt of a Handover Complete message from the target base station; and transmitting a packet through a new path according to the handover.

8. The method of claim 7, wherein the step of deciding the handover includes the steps of:

transmitting requested resource information to the target base station in the predicted handover cell, receiving a Handover Pre-confirm message from the target base station, and transmitting a Context Data message to the target base station;

storing the received Context Data message in the target base station and reserving a new Cell-Radio Network Temporary Identity value; and estimating a Timing Advance value and information about the quality of a uplink wireless channel between the target base station and the user equipment to finally decide whether to accept the handover, and transmitting a Context Confirm message to the source base station.

9. The method of claim 8, wherein the Handover Pre-confirm message includes resource information of the target base station.

10. The method of claim 8, wherein the Context Data message includes user context information for synchronization.

11. The method of claim 8, wherein the Context Confirm message includes one or more of a Cell-Radio Network Temporary Identity value, information about the quality of an uplink wireless channel between the user equipment and a target base station, a Timing Advance value, and information about uplink and downlink resources.

12. The method of claim 7, wherein the step of transmitting the handover command includes the steps of:

receiving a Context Confirm message by the source base station from the target base station, and stopping and buffering transmission of downlink user data; and transmitting a Handover Command message from the source base station to the user equipment.

13. The method of claim 12, wherein in the step of transmitting the Handover Command message, the Handover Command message is transmitted immediately after transmission of downlink data if the downlink user data are downlink Constant Bit-Rate (CBR) data.

14. The method of claim 12, wherein in the step of transmitting the Handover Command message, the Handover Command message is transmitted from the source base station to the user equipment immediately upon receipt of a Downlink Check Response message from a Radio Link Control (RLC), after completion of preparation to transmit the Handover Command message after transmission of the Context Confirm message from the source base station to the target base station.

15. The method of claim 12, wherein in the step of transmitting the Handover Command message, the Handover Command message is transmitted from the source base station to the user equipment immediately after the elapse of time, which is two times longer than the inter-packet time of CBR data, when failing to receive a Downlink Check Response message from a Radio Link Control (RLC), after completion of preparation to transmit the Handover Command message after transmission of the Context Confirm message from the source base station to the target base station.

16. The method of claim 7, wherein the step of transmitting the time alignment value to the gateway includes the steps of:
processing a response for a Handover Command message received from the source base station, and transmitting ARQ-related information to the target base station;
setting, by the target base station, an ARQ according to the ARQ-related information received from the source base station and stopping an ARQ timer;
transmitting a packet stored in the source base station and a currently-received packet from the source base station to the target base station and buffering the packets; and
calculating, by the target base station, a time alignment value based on the timing information of data transmission between the gateway and the source base station and the timing information of data transmission between the source base station and the target base station, and transmitting the calculated time alignment value to the gateway.

17. The method of claim 7, wherein the step of transmitting the packet includes the steps of:
applying, by the gateway, the time alignment value received from the target base station and switching a path from the source base station to the target base station;
receiving, by the target base station, the first packet from the gateway after receipt of the last packet from the source base station; and
transmitting downlink data from the gateway to the user equipment through the target base station.

18. The method of claim 7, wherein the gateway includes a mobility management entity (MME) and a user plane entity (UPE).

* * * * *